United States Patent
Kosodo et al.

[11] Patent Number: 6,102,824
[45] Date of Patent: *Aug. 15, 2000

[54] REDUCTION GEAR APPARATUS

[75] Inventors: Hiroshi Kosodo, Ibaraki-ken; Satoshi Otsuka, Kanagawa-ken, both of Japan

[73] Assignees: Okubo Hagurma Kogyo Kabushiki, Kanagawa-ken; Uchida Yuatsu Kiki Kogyo Kabushiki Kaisha, Tokyo, both of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/081,861

[22] Filed: May 21, 1998

[30] Foreign Application Priority Data

May 26, 1997 [JP] Japan ................................. 9-135174

[51] Int. Cl.[7] ............................. F16H 47/04; F01B 1/00
[52] U.S. Cl. .................................. 475/83; 91/492; 92/72
[58] Field of Search ............................. 475/83; 91/491, 91/492; 92/72

[56] References Cited

U.S. PATENT DOCUMENTS

| | | | |
|---|---|---|---|
| 3,511,131 | 5/1970 | Kress | 91/472 X |
| 3,692,434 | 9/1972 | Schnear | 91/491 X |
| 3,862,589 | 1/1975 | Eickmann | 91/492 X |
| 3,943,826 | 3/1976 | Kita | 91/491 X |
| 4,126,994 | 11/1978 | Rockwell | 91/492 X |
| 4,131,056 | 12/1978 | Rockwell | 91/492 |
| 4,258,548 | 3/1981 | Hall et al. | 91/492 X |
| 4,581,895 | 4/1986 | Kress | 91/491 X |
| 4,704,948 | 11/1987 | Wüsthof et al. | 91/491 X |
| 5,188,572 | 2/1993 | Yamaguchi et al. | 475/168 |
| 5,248,283 | 9/1993 | Eckhardt et al. | 475/72 |
| 5,746,509 | 5/1998 | Gebhard et al. | 92/72 X |
| 5,813,228 | 9/1998 | Kubota et al. | 475/83 X |
| 5,820,506 | 10/1998 | Mann | 475/83 |
| 5,928,099 | 7/1999 | Tsunemi | 475/83 |

FOREIGN PATENT DOCUMENTS

| | | | |
|---|---|---|---|
| 449178 | 11/1974 | U.S.S.R. | 475/83 |
| 1 259 834 | 1/1972 | United Kingdom | 475/83 |

*Primary Examiner*—Charles A Marmor
*Assistant Examiner*—Ha Ho
*Attorney, Agent, or Firm*—Arent Fox Kintner Plotkin & Kahn, PLLC

[57] ABSTRACT

An output shaft is constituted by a plurality of rotary shafts which are disposed on the same axial line so as to be rotatable relative to each other. A cam ring which fixedly encloses one of said rotary shafts has a cam surface with radial projections and recessions on an inner peripheral surface of the cam ring. A cylinder block which is mounted on said one of the rotary shafts has formed therein a plurality of cylinders for containing in each thereof a piston which is radially moved by sliding contact with the cam surface. A sun gear is mounted on said one of the rotary shafts. Planetary gears are mounted on remaining at least one of the rotary shafts so as to be rotatable in gearing mesh with the sun gear and an internal gear which is fixedly mounted around the sun gear.

2 Claims, 4 Drawing Sheets

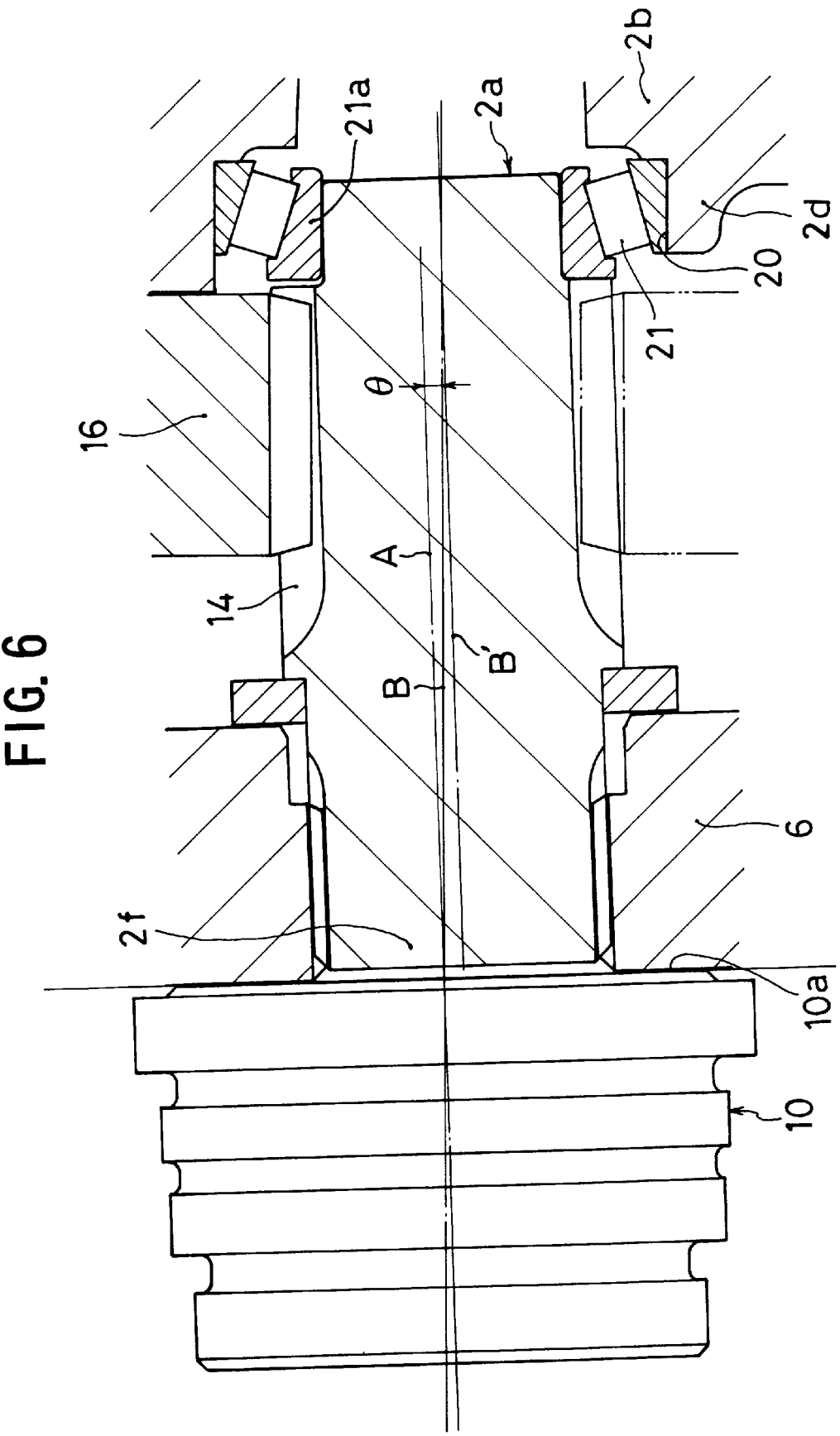

REDUCTION GEAR APPARATUS

BACKGROUND OF THE INVENTION

1. Field of the Invention

The present invention relates to a reduction gear apparatus (or a speed reducer) which is used for speed reduction of various machines such as a concrete mixing car, a swiveling apparatus and a travelling apparatus for a hydraulic shovel, a lifting apparatus for a carriage car (or a transporting car), or the like.

2. Description of the Related Art

In various kinds of machines, there has hitherto been practiced to reduce the rotational speed of the machine by the combination of a hydraulic motor and a toothed gear type of reduction gear, or only by a hydraulic motor. The object of using this kind of speed reducing means is to obtain a low speed and high torque. For this purpose, the following arrangement has been employed. Namely, the hydraulic pump is driven by a driving source such as an engine of the machine. The delivery fluid or discharged fluid from the hydraulic pump is supplied to a swash plate type of axial piston motor "a" as shown, e.g., in FIG. 1. The rotation of a rotary shaft b of the axial piston motor "a" is transmitted to a planetary gear reduction apparatus c. In this manner, a low speed and high torque of speed reduction ratio of 15 through 130 is obtained from a rotary shaft (output shaft) d. Instead of the axial piston motor "a" a swash plate type of axial piston pump is sometimes used. Further, as shown in FIG. 2, there has also been practiced to supply a pressurized fluid from a hydraulic pump which is driven by a driving source to a multiple stroke type of radial piston motor i. This multiple stroke type of radial piston motor i is made up of a cam ring e which is disposed around an output shaft d and which has a cam surface with a radially projected and recessed inner peripheral surface, and pistons h which move, along the cam surface, radially into, and out of, cylinders g of a cylinder block f which are mounted on the output shaft d. Low speed and high toque can thus be obtained.

In the above-described conventional reduction gear apparatus which is made up solely of the hydraulic motor, when the torque to be outputted becomes large, the hydraulic motor also becomes large and of special construction. It thus requires a large space for mounting. The weight also becomes large, with the result that it is no longer suitable for use in a vehicle. In the apparatus in which the axial piston motor and the planetary gear are combined, on the other hand, the axial piston motor is designed to obtain a high speed and low torque. Therefore, in order to obtain the predetermined low speed and high torque, the reduction ratio is set to be about 15 through 130. In order to obtain this range of gear ratios, there will be required a planetary gear mechanism of two to three stages of speed reduction. As a result, as shown in FIG. 1, the total length becomes large and the weight also becomes large, resulting in a higher cost.

In view of the above-described disadvantages in the conventional apparatuses, the present invention has an object of providing a reduction apparatus in which a low speed and high torque can be obtained and which is small in size and light in weight and can be manufactured at a smaller cost.

SUMMARY OF THE INVENTION

In order to attain the above and other objects, the present invention is a reduction gear apparatus comprising: an output shaft which is constituted by a plurality of rotary shafts which are disposed on the same axial line so as to be rotatable relative to each other; a cam ring which fixedly encloses one of the rotary shafts, the cam ring having a cam surface with radial projections and recessions on an inner peripheral surface of the cam ring; a cylinder block mounted on said one of the rotary shafts, the cylinder block having formed therein a plurality of cylinders for containing in each thereof a piston which is radially moved by sliding contact with the cam surface; a sun gear mounted on said one of the rotary shafts; and planetary gears mounted on remaining at least one of the rotary shafts so as to be rotatable in gearing mesh with the sun gear and an internal gear which is fixedly mounted around the sun gear.

Preferably, a front end of said one of the rotary shafts is connected to a rear end of the remaining at least one of the rotary shafts via a thrust bearing, and the sun gear is formed on a peripheral surface of an intermediate portion of said one of the rotary shafts.

The reduction gear apparatus preferably further comprises: a slide valve which slidably contacts a side surface of the cylinder block in a rear end portion of said one of the rotary shafts; and fluid supply and discharge control ports for the cylinders, the control ports being provided in the side surface of the cylinder block and in that side surface of the slide valve which is in slidable contact with the cylinder block.

Preferably, said one of the rotary shafts is disposed so as to be swingable about a front end portion which is supported by the thrust bearing, and a slide valve is slidably abutted with the side surface of the cylinder block which is provided on a rear end portion of said one of the rotary shafts, the slide valve having fluid supply and discharge control ports for the cylinders. In this arrangement, the slide valve and the cylinder block can be slidably abutted with each other without a clearance therebetween. The volume efficiency of the motor can be improved. In order to make sure that the rotary shaft is swingable, preferably, the front end portion of said one of the rotary shafts is loosely fitted into an inner race of the thrust bearing such that said one of the rotary shafts is rotatably supported.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 6 is a schematic diagram to explain a condition of fitting to an inclined slide valve.

DETAILED DESCRIPTION OF A PREFERRED EMBODIMENT

Figure 1:
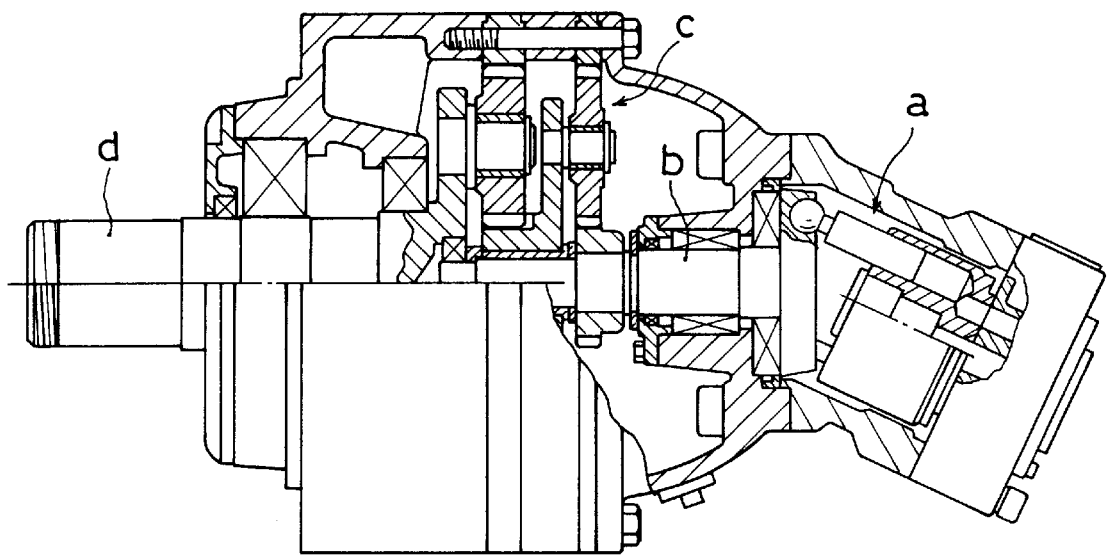
FIG. 1 is a side view, partly shown in section, of a reduction gear apparatus of a conventional swash plate type of axial piston motor in which a reduction gear is contained therein.
Figure 2:
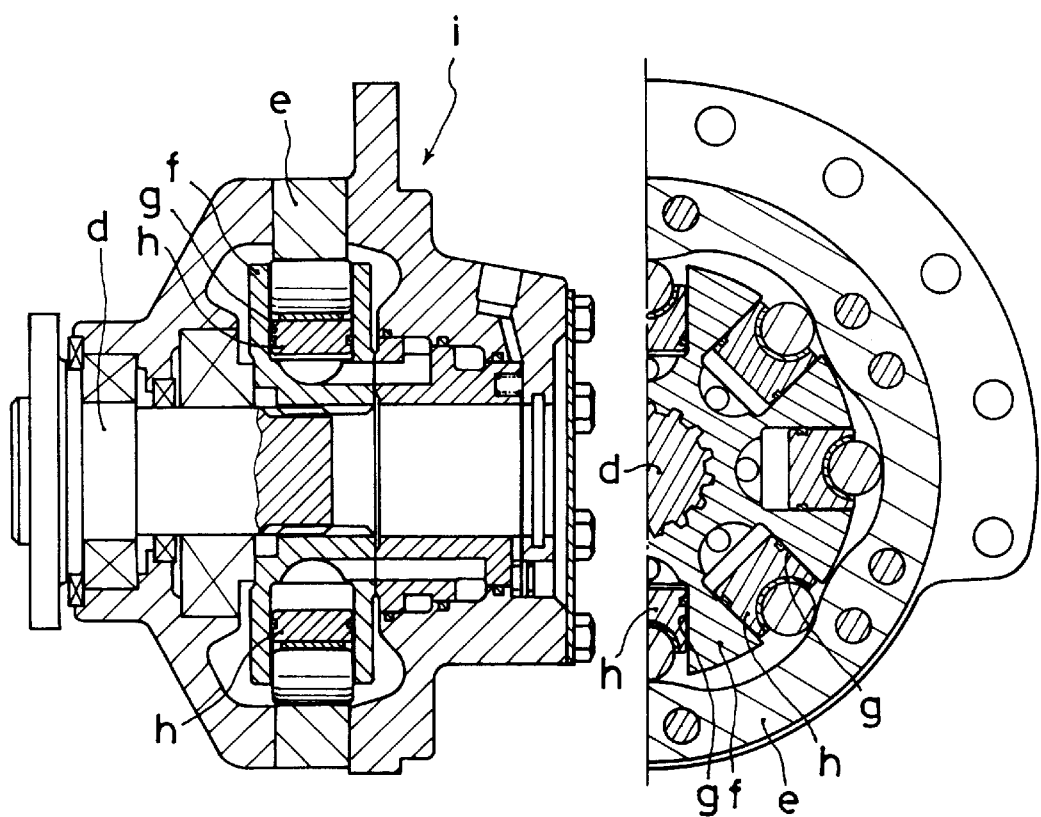
FIG. 2 is a sectional view of a conventional multiple-stroke type of radial piston motor.
Figure 3:
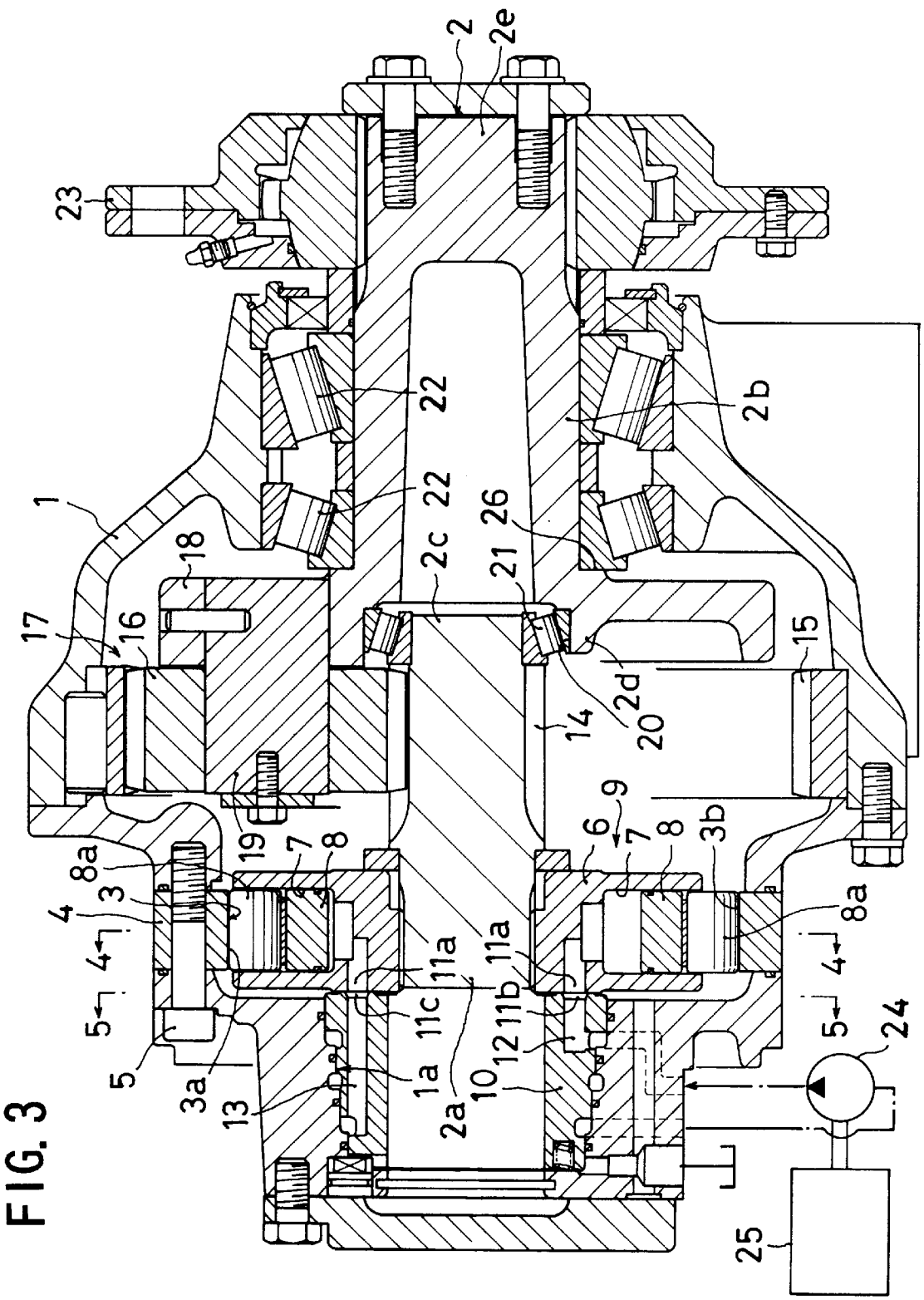
FIG. 3 is a sectional side view of one embodiment of the present invention.
Figure 4:
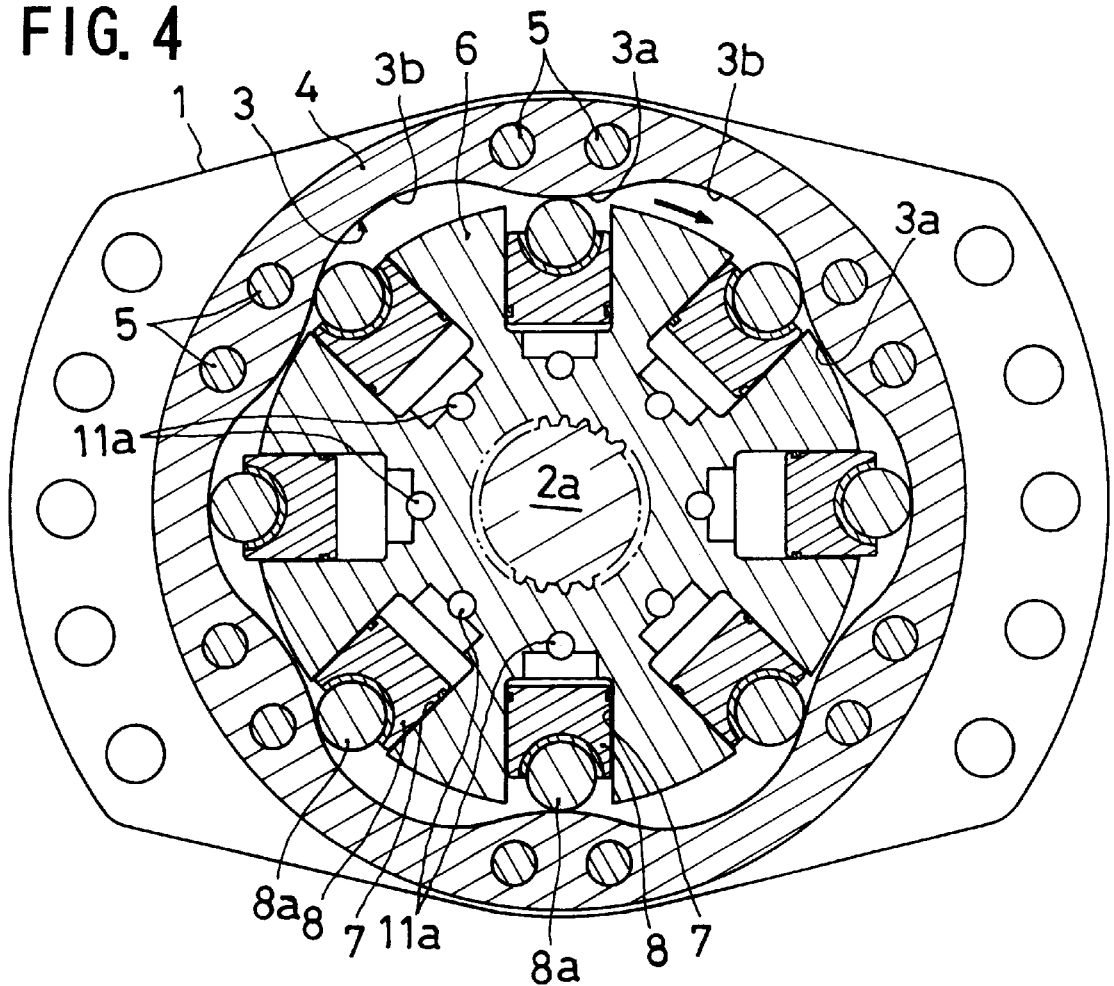
FIG. 4 is a sectional view taken along the line 4—4 in FIG. 3.

An explanation will now be made about an embodiment of the present invention with reference to the enclosed drawings. In FIG. 3 reference numeral 1 denotes a casing of a reduction gear, reference numeral 2 denotes an output shaft which is made up of a plurality of relatively rotatable rotary shafts 2a, 2b disposed on the same axial line. This output shaft 2 is arranged to extend from the inside of the casing 1 toward the outside thereof. In a manner to enclose one 2a of the output shafts 2a, 2b which constitute the output shaft 2, there is disposed a cam ring 4 so as to be fixed to the casing 1 by means of bolts 5. This cam ring 4 has on its inner circumference a cam surface 3 of a trochoidal curve which is made, as shown in FIG. 4, by alternately arranging six mountains (projections) 3a and six valleys (recesses) 3b which respectively project and recess in the diametrical direction. A cylinder block 6 is provided on the rotary shaft 2a so as to rotate therewith. The cylinder block 6 is provided with eight cylinders, for example, which are disposed at an equal distance to each of them so as to extend in the radial direction. Each of the cylinders 7 contains therein a piston 8 which is moved in the radial direction as a result of sliding contact with the cam surface 3. At the head (i.e., a radially outward end) of each of the pistons 8, there is provided a cam roller 8a so as to facilitate the smooth slidable rotation along the cam surface 3. The cam ring 4, the cylinder block 6, the cylinders 7, and the pistons 8 constitute a radial piston motor 9. Supplying and discharging of the fluid to and from each of the cylinders 7 are controlled by a cylindrical slide valve 10 which slidably contacts the side surface of the cylinder block 6 and which is fixed to a three-stage stepped portion 1a formed in the casing 1. Even in case the amount of suction into the eight cylinders 7 is designed to be about several hundreds cubic centimeters per one revolution, the width of the cylinder block 6 can be made in as small a size as about 60 mm, and the outer diameter of the cam ring 4 can be made as small as about 300 mm.

Figure 5:
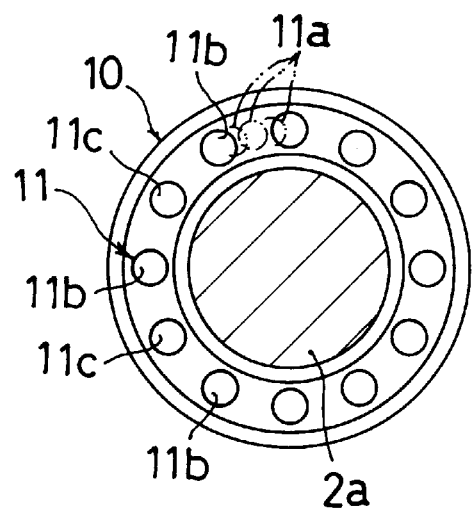
FIG. 5 is a sectional view taken along the line 5—5 in FIG. 3.

The operation of the radial piston motor 9 is not particularly different from that of a conventional motor of this kind. As shown in FIGS. 4 and 5, fluid supply and discharge control ports 11 to control the supply and discharge of the fluid to and from the cylinders 7 are constituted by the following elements: i.e., that control port 11a for supply and discharge of the fluid which is formed in fluid flow communication from each of the cylinders 7 to the side surface of the cylinder block; and those control ports 11b, 11c which are formed in twelve in number, i.e., two each, so as to extend toward the region of each of the valleys 3b of the cam ring 4. These control ports 11a–11c are disposed on a circle which is formed about the axial line of the rotary shaft 2a. When the cylinder block 6 and the rotary shaft 2a are rotated in the direction of the arrow as shown in FIG. 4, the fluid discharged from a hydraulic pump 24 as shown in FIG. 3 is supplied, via a passage 12 inside the slide valve 10, to one set 11b of the control ports for supply and discharge of the fluid in the valleys 3b. The remaining set 11a of the control ports 11c is connected to a drain via a passage 13 inside the slide valve 10. According to this arrangement, for each of the pistons 8 which are positioned in the cam surface 3 which extends (or continues) to the valley 3b of the cam ring 4, the piston 8 is pushed out by the pressurized fluid which is supplied from the control port 11b to the cylinder 7, whereby a rotational force in the direction of the arrow is generated. For each of the pistons 8 which are positioned in the cam surface 3 which extends (or continues) to the mountain 3a of the cam ring 4, the fluid inside the cylinder 7 is discharged to the drain via the control port 11c. The piston 8 is thus pushed to the cam surface 3 in a manner not to interfere with the above-described rotational force, whereby the cylinder block 6 and the rotary shaft 2a are rotated in the direction of the arrow. In the illustrated example, when each of the pistons 8 has reciprocated six times, the rotary shaft 2a rotates by one revolution.

Reference numeral 14 denotes a sun gear which is formed on the outer periphery of an intermediate portion of the rotary shaft 2a. A planetary reduction gear mechanism 17 which reduces the speed in one stage is constituted by the sun gear 14, an internal gear 15 which is fixedly disposed on the casing 1 around the sun gear 14, planetary gears 16 which rotate in gearing mesh with these gears 14, 15, and the rotary shaft 2b. The planetary gear 16 is provided in three in number, for example, and each is supported by a supporting shaft 19 which is provided at an equal distance from each other in a flange 18 which extends in the radial direction from the rotary shaft 2b. The planetary reduction gear mechanism 17 is set to a gear ratio of 4 through 7, for example.

That front end portion 2c of said one 2a of the rotary shafts which constitute the output shaft 2 is inserted into an axial hole 20 which extends from that rear end portion 2d of the other 2b of the rotary shafts in which is provided the flange 18, and is supported inside the axial hole 20 by a thrust bearing 21. The above-described one 2a of the rotary shafts is rotated while being supported by the thrust bearing 21 and the cam ring 4 via the pistons 8 and the cam rollers 8a. The other 2b of the rotary shafts is rotatably supported by the casing 1 by means of a stepped portion 26 which is formed on an outer periphery thereof and heavy-duty radial bearings 22, 22. Reference numeral 23 denotes that mounting member for mounting a rotary member which is provided at a front end of the rotary shaft 2b.

The side surfaces of the slide valve 10 and the cylinder block 6 are preferably made to be in slidable contact without a clearance therebetween to minimize the leakage of the fluid from the sliding portion. However, as shown in FIG. 6, there is a case in which the slide valve 10 is mounted on the casing 1 such that the central axis A thereof is inclined relative to the central axis B of the rotary shaft 2a. In such a case, there will occur a clearance between the sliding surface 10a of the slide valve 10 and that side surface of the cylinder block 6 which is perpendicular to the central axis B. The fluid therefore leaks through the clearance, with the result that the volume efficiency of the motor lowers. In addition, a smooth operation at a low speed, which is one of the characteristics of the radial piston motor, is impaired. If the inclination of the slide valve 10 is corrected, this lowering in the volume efficiency may be prevented to thereby enable the radial piston motor to perform the expected functions. However, the work of this correction takes time and is not easy. According to the reduction gear apparatus of the present invention, said one 2a of the rotary shafts which constitute the rotary shaft 2 is supported in a cantilevered manner by the thrust bearing 21 at its front end portion 2c and the rear end 2f thereof is free. Therefore, by disposing the rotary shaft 2a in a manner swingable about the front end portion 2c, the side surface of the cylinder block 6 can be made to follow the inclination of the sliding surface 10a of the slide valve 10, with the result that the sliding contact without a clearance becomes possible. The other 2b of the rotary shafts is supported by the two radial bearings 22 in a manner not to be swingable. Therefore, the position of the thrust bearing 21 is immovable. In order to make the rotary shaft 2a swingable, it is preferable to loosely fit the front end portion 2c into the inner race 21a of the thrust bearing 21. Even if the central axis A of the slide valve 10 gives rise to an inclination θ relative to the central axis B, as shown in FIG. 6, the rotary shaft 2a swings about the front end portion 2c such that the central axis B becomes a position B' parallel to the central axis A. As a result, the side surface of the cylinder block 6 and the side surface 10a of the slide valve come into close sliding contact with each other without a clearance therebetween, whereby the leak therethrough decreases. It becomes thus possible to prevent the lowering in volume efficiency of the motor without making particular corrections, thus securing a smooth rotation at a low speed.

In the radial piston pump motor 9 as shown in FIG. 3, the pressurized fluid is supplied from the hydraulic pump 24 to be operated by an engine 25 which is mounted on a machine such as a concrete mixing car, or the like. The pistons 8 of the radial piston motor 9 move into and out of the cylinders, whereby the cylinder block 6 and the rotary shaft 2a rotate. As a result of this rotation, the sun gear 14 and the planetary gears 16 of the planetary gear mechanism 17 are rotated. The rotary shaft 2b on which are mounted the planetary gears 16 is rotated at a smaller (reduced) speed of rotation than the rotational speed of the engine 25. The rotary shaft 2a of the radial piston motor 9 may be rotated at a speed which is 4 to 7 times the reduced speed of rotation which is required by the rotary shaft 2b. Therefore, as the hydraulic pump 24 which supplies the fluid to the radial piston motor 9, a pump which is relatively small in volume and inexpensive will suffice. Further, even if a large torque is required in the rotary shaft 2b, it is sufficient to provide a small radial piston motor 9 which can obtain a torque of about ¼ to ⅐ of the required torque. This motor 9 can also be manufactured cheap. Still furthermore, since the planetary reduction gear mechanism 17 is constructed into one-stage speed reduction, it is easy to manufacture and its cost becomes smaller. The fluid to be supplied from the slide valve 10 to the cylinders 7 partly penetrates into the clearance between the slide valve 10 and the cylinder block 6 to thereby form an oil film for lubrication. By the pressure of the fluid that flows into the clearance, the slide valve 10 is pressed or urged against the stepped portion 1a of the casing 1. As a result of its reaction force, the cylinder block 6 and said one 2a of the rotary shafts give rise to thrust forces toward the other 2b of the rotary shafts. This thrust force is supported on the casing 1 via the stepped portion 26 of the other 2b of the rotary shafts by means of the thrust bearing 21 which is disposed at the front end portion 2c of said one 2a of the rotary shafts. Therefore, there will occur no harm by the thrust force which is due to having provided the radial piston motor 9. A sufficient strength can also be maintained even against uneven radial loads by making the other 2b of the rotary shafts larger in size than said one 2a of the rotary shafts and by rotatably supporting it by the heavy-duty radial bearings 22. When compared with a conventional reduction gear apparatus having the same capacity, the reduction gear apparatus of the present invention can be reduced in weight by about 30% and in length by about 30%.

As has been explained hereinabove, according to the present invention, the following arrangement has been employed. Namely, an output shaft is constituted by a plurality of rotary shafts which are disposed on the same axial line so as to be rotatable relative to each other. A cam ring which has a cam surface on an inner peripheral surface of the cam ring is fixedly disposed on an outer periphery of one of the rotary shafts. The cam surface operates to move the pistons in a cylinder block which is integral with said one of the rotary shafts, whereby a radial piston motor is constituted. A planetary type of reduction gear is constituted by a sun gear which is provided on said one of the rotary shafts and planetary gears which are mounted on the other of the rotary shafts so as to be in gearing mesh with an internal gear which is disposed around the sun gear. As a result of the above-described arrangement, said one of the rotary shafts of the radial piston motor serves the dual function of the sun gear. The thrust force to be generated in said one of the rotary shafts can therefore be supported or received by a bearing at the front end portion of said one of the rotary shafts. The total axial length of the reduction gear apparatus can therefore be shortened. It thus becomes possible to combine a small-sized radial piston motor and a planetary reduction gear of one-stage speed reduction. It also becomes possible to construct a low-speed and high-torque reduction gear apparatus in a compact manner in light weight. By supporting said one of the rotary shafts by the thrust bearing such that the rotary shaft is swingable about the front end portion thereof, even if there is an inclination in the slide valve, the side surface of the cylinder block can automatically be slidably abutted with the sliding surface of the slide valve without a clearance therebetween. As a result, the volume efficiency of the motor and the properties of smooth low-speed rotation can be maintained. The construction of swingably supporting said one of the rotary shaft can be attained by a simple arrangement in that the front end portion of said one of the rotary shafts is loosely fitted into the inner race of the thrust bearing.

The above-described explanation has been made with reference to an example in which the rotary shafts are made by two shafts. The present invention can, however, be applied to an example in which the rotary shafts are made into three or more in number.

It is readily apparent that the above-described reduction gear apparatus meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A reduction gear apparatus comprising:

an output shaft which is constituted by at least first and second rotary shafts which are disposed on the same axial line so as to be rotatable relative to each other;

a cam ring which fixedly encloses said first rotary shaft, said cam ring having a cam surface with radial projections and recessions on an inner peripheral surface of said cam ring;

a cylinder block mounted on said first rotary shaft moveable radially with a rear-end portion of said first rotary shaft, said cylinder block having formed therein a plurality of cylinders for containing in each thereof a piston which is radially moved by sliding contact with said cam surface;

a sun gear mounted on said first rotary shaft;

planetary gears mounted on said second rotary shaft so as to be rotatable in gearing mesh with said sun gear and an internal gear which is fixedly mounted around said sun gear, a roller thrust bearing, a front end portion of said first rotary shaft being connected to a rear end of said second rotary shaft via said roller thrust bearing and being swingably fitted into an inner race of said roller thrust bearing such that said first rotary shaft is pivotable about the front end portion of the said first rotary shaft; and a slide valve slidably abutted with a side surface of said cylinder block which is provided on the rear end portion of said first rotary shaft, said slide valve having fluid supply and discharge control ports for said cylinders.

2. A reduction gear apparatus according to claim 1, wherein said sun gear is formed on a peripheral surface of an intermediate portion of said first rotary shaft and wherein said cylinder block is provided on said rear end portion of said first rotary shaft.

\* \* \* \* \*